Dec. 31, 1957  G. S. CLAPSADDLE, JR  2,817,941
FLOATING GATHERER POINT FOR CORN PICKERS
Filed April 6, 1956  2 Sheets-Sheet 1
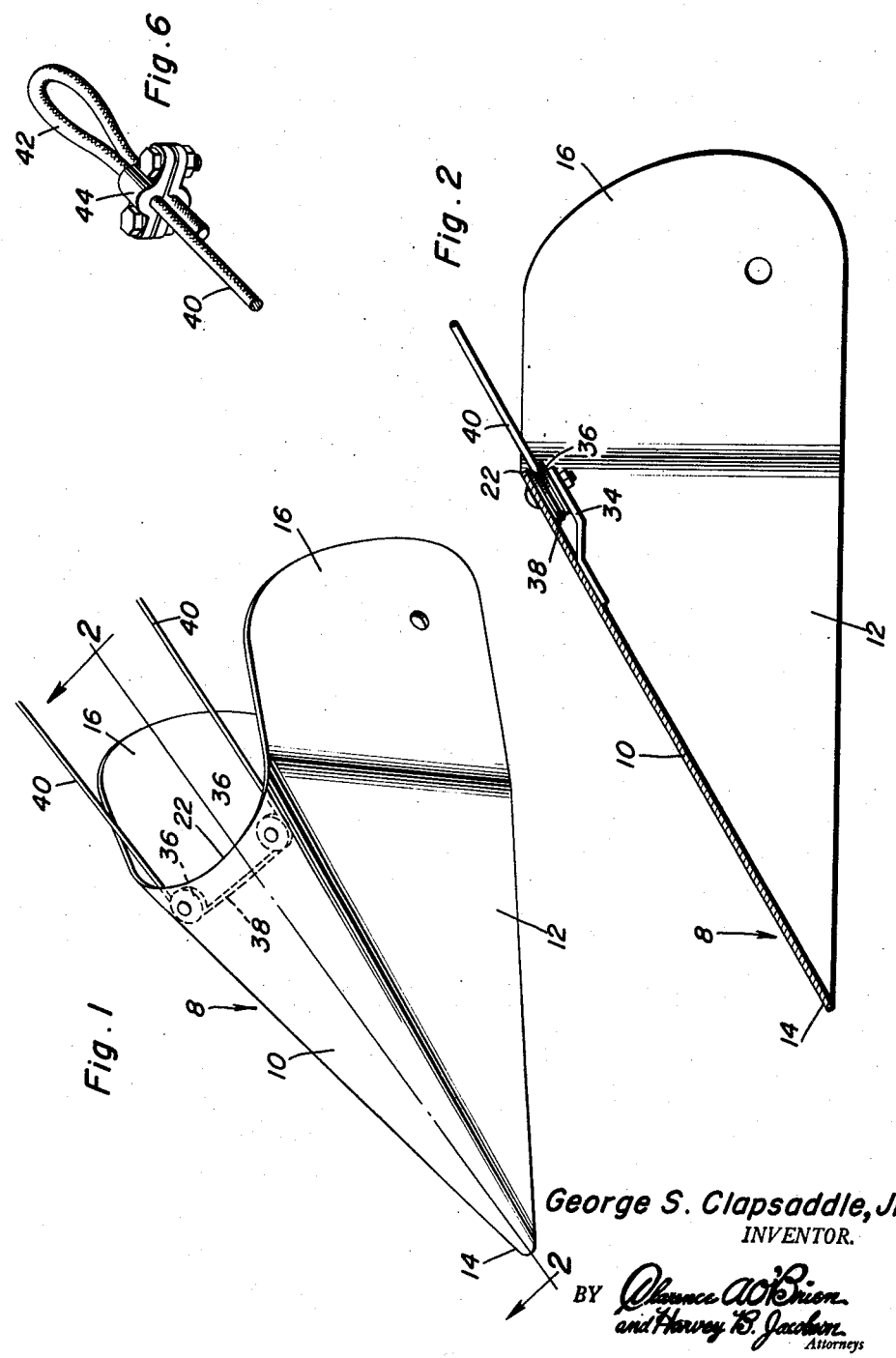
George S. Clapsaddle, Jr.
INVENTOR.

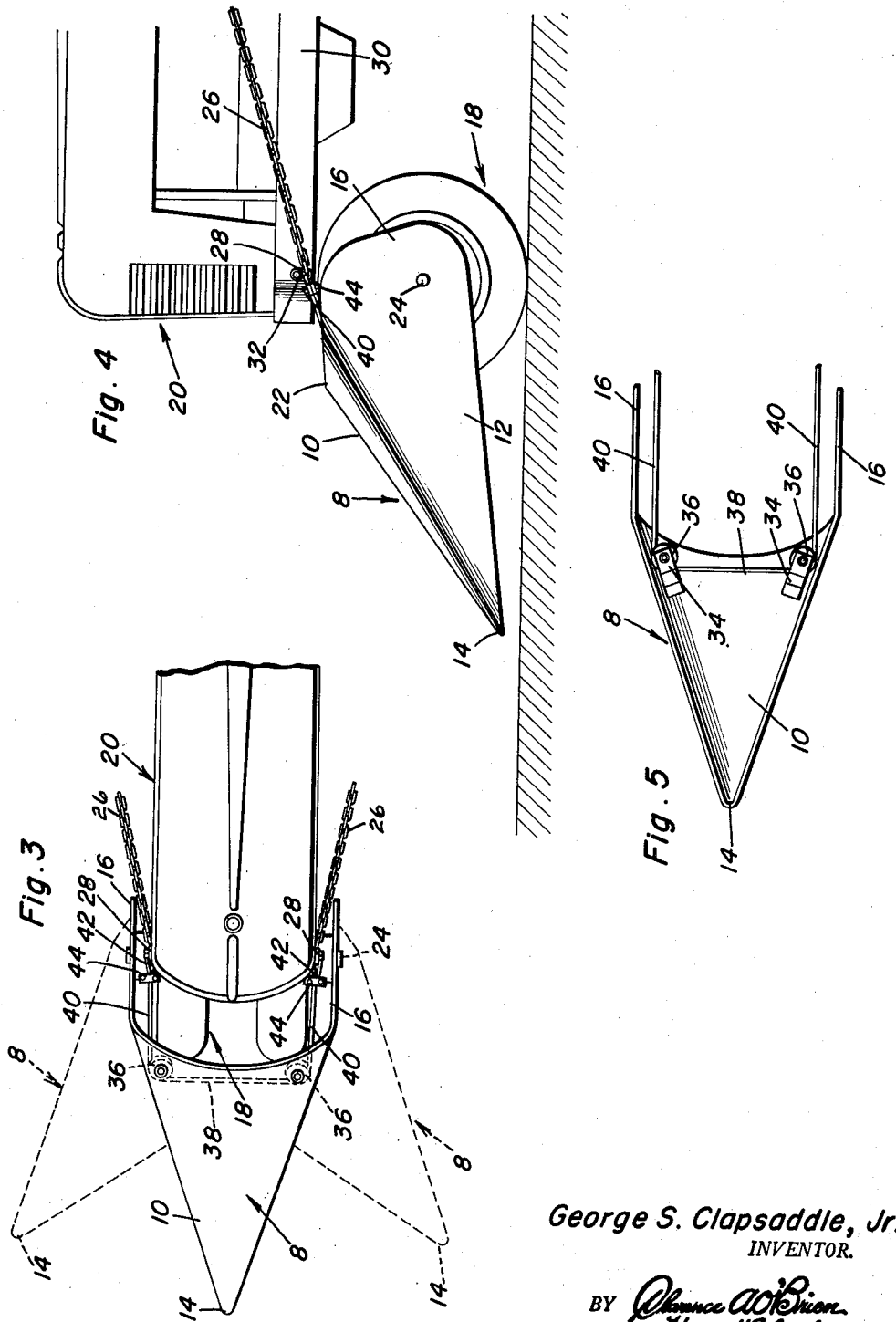

United States Patent Office 2,817,941
Patented Dec. 31, 1957

2,817,941

FLOATING GATHERER POINT FOR CORN PICKERS

George S. Clapsaddle, Jr., Whitten, Iowa

Application April 6, 1956, Serial No. 576,622

3 Claims. (Cl. 56—119)

The present invention relates to mechanical corn pickers and one objective is to bring corn picking more satisfactorily up to date and in line with other modern, low-cost power farming operations, to promote a saving in labor and to appreciably reduce expense, to say nothing of the ears of corn which can be and are saved.

Keeping in mind the problems of gathering and harvesting and the advantages attainable by devices which are possessed of better mechanical efficiency, much thought has been given to the particular construction and mode of operation of gatherers such as are mounted on and carried by and project in advance of the tractor. As a general rule the leading end of the gathering means is characterized by a plurality of cooperating long sloping gathering points. These are somewhat conical in plan and are fashioned with varying types of surface contacting shoes and are mounted in different ways to save the maximum of corn under different crop conditions.

It is a matter of common knowledge to those familiar with the problem at hand that gatherer points and other portions of the gatherer structure have to be shaped and smoothly proportioned and move along the ground so that no broken or low-lying stalks will be missed. The fact that the stalks are tangled and lodged every precaution is necessary in picking up, separating and piloting the down stalks into the paths in which the fingered endless gathering chains operate.

As a general rule there are at least two gatherer points for single row machines and a center divider or point and side points for two row machines. Insofar as the instant invention is concerned and in order to focus attention on the novelty only a single point is shown and described. In fact the improvement was primarily adapted to function in conjunction with certain corn pickers currently manufactured and sold by the International Harvester Company. At present the gathering point or nose, as it is sometimes called, is attached to the front end of the tricycle type tractor on chains. Under this construction the gathering point does not work satisfactorily and it has caused a great deal of trouble. This situation has posed a problem of providing a more satisfactory mounting for the gathering point. Therefore, the object of this invention is to provide a fender-like inverted U-shaped gatherer point having side extensions at the rear which provide wings and which are mounted on the hub portions of the twin wheel assembly at the front of the tractor. Instead of using spring tensioned chains such as are customarily employed in this type of a gatherer point, an arrangement of pulleys and a flexible elements is utilized to provide a sling and this flexibly supports the gathering point so that it may swing in an arc side-to-side in conjunction with the steerable front wheels of the tractor and to in this manner more satisfactorily perform its intended task.

Other objects, features and advantages will become more readily apparent from the following description and the accompanying sheets of illustrative drawings.

In the drawings wherein like numerals are employed to designate like parts throughout the views:

Figure 1 is a perspective view of the improved fender-type center gatherer point constructed in accordance with the principles of the invention and removed, of course, from the tractor on which it is usually mounted;

Figure 2 is a section on the line 2—2 of Figure 1 looking in the direction of the arrows;

Figure 3 is a plan view showing how the invention is used on and in association with the forward end portion of a conventional-type tractor;

Figure 4 is a side elevation of the same;

Figure 5 is a bottom plan view; and

Figure 6 is a perspective of one of the details.

As before stated the improved gatherer point is more or less of conventional long slender tapering and fender-like design and it is denoted by the numeral 8. It is of appropriate sheet metal or the like and is somewhat V-shaped in plan and channel-shaped in cross-section. The central or crown portion is convex and denoted by the numeral 10 and the depending side walls constitute skirts 12 and these all merge into a leading end or lifting and piloting point 14. The rear end portions of the skirts are fashioned into wing-like extensions 16 which embrace the steerable front wheels 18 of the conventional tractor 20. The upper curved edge portion 22 is spaced from and clears the front wheels as shown. The wings are fashioned with bearings (not shown) so that they may be hingedly mounted on the trunnion-like extensions 24 of the front wheel assembly 18. The usual chains 26 (see Patent 2,473,978 of June 21, 1949) have their forward end portions cut off in keeping with the requirements of the instant improvements. However, the rear end portions of the chains are retained and these are shown on the opposite sides of the tractor. The forwardmost links of these chains are connected with what is called an anchoring link 28 mounted on the chassis 30 by an assembling and retaining bolt 32. Underneath the hood-like portion I provide suitable brackets 34 equipped with free idling pulleys or sheaves 36. These pulleys are spaced apart in the manner shown in Fig. 5. That is to say, they are opposite each other and in a position to accommodate the bight portion 38 of a substantially U-shaped flexible cable. This cable provides a sling and the parallel end portions or runs 40 extend rearwardly where they are fashioned into loops 42 of the type shown in Figure 6 with the loops maintained by the loop forming clamps 44. These looped ends are connected, with the aforementioned anchor links 28 (Figs. 3 and 4). However, said looped ends 40 may be fastened in various other ways (not detailed). Thus the cable has to be of the desired length to form a sling and with the sling engaged with the pulleys and the pulleys bracketed on the hood portion of the fender-like gatherer point the latter is thus suspended or hung in an obvious floating manner. Consequently, as the front wheels turn right, or left under steering requirements and the gatherer point cooperates in unison therewith, the pulleys track back and forth on the intermediate portion of the suspension sling, that is, the cable. This is brought out in full and phantom lines in Fig. 3 of the drawings.

By employing a sheet of metal and bending it into fender-like form and tapering it provides the required slender gatherer and pick up point. The side walls or skirt portions and central hood or crown provide the desired piloting and camming results and the ear-like extensions 16 provide for hingedly mounting the over-all device on the steerable wheel assembly to swing back and forth in horizontal plane. To adjust the picker center divider simply set the picker on level surface and lower the picker to an operating position. Pass the loose ends 40 of the cable through the pulleys 36 and anchor the end portions in the manner described and adjust the clamp-equipped loops 42 to take up whatever slack is needed so that the clearance between the gatherer point and the ground will be about 5 inches or so.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a tricycle type tractor characterized by a chassis having a steerable wheel assembly at the front of the chassis, said assembly being provided with axially aligned trunnions on opposite sides of the wheel assembly, a hollow fender-like longitudinally attenuated sloping and tapering gatherer point having a central hood portion and depending skirt portions, the rearward ends of said skirt portions having wing-like extensions hingedly mounted on said trunnions, the rearward upper edge portion being spaced from and providing requisite clearance between the gatherer point and forward end of the chassis whereby said gatherer point is permitted to be vertically raised and lowered for height adjustments, and swung from left to right in a horizontal plane in conjunction with the wheel assembly and so that it is thus dirigible in character, pulleys operatively mounted on a rearward portion of said gatherer point, and a flexible cable having rear end portions adjustably connected with portions of said chassis above the wheels of said wheel assembly, said pulleys being arranged opposite each other and coplanar and being engaged with and travelling from left to right and vice versa on the intermediate portion of said cable.

2. In combination, a tricycle type tractor including a chassis having a front steerable wheel assembly, a gatherer point located in front of, in alignment with, and mounted on, and operable in conjunction with the wheels of said wheel assembly, a substantially U-shaped flexible cable having an intermediate portion and end portions extending laterally from the respective ends of said intermediate portion and terminating and anchored on opposite sides of said chassis, and pulleys mounted on an underneath rear end portion of said gatherer point, said pulleys being operatively engaged with the intermediate portion of said U-shaped cable.

3. An attachment for a tractor comprising a hollow fender-like gatherer point having attaching and supporting wings, having an underneath rear side provided with spaced apart freely rotatable pulleys, and a U-shaped cable having an intermediate portion underlying the underneath side of said gatherer point, spanning the space between and operatively connected with said pulleys and further having end portions lateral to said intermediate portion and formed with adjustable anchoring loops attachable to anchor means provided on a tractor.

References Cited in the file of this patent

UNITED STATES PATENTS

| 1,811,054 | Kipp et al. | June 23, 1931 |
| 2,473,978 | Van Buskirk | June 21, 1949 |

FOREIGN PATENTS

| 412,877 | Great Britain | July 5, 1934 |